US006128396A

United States Patent [19]

Hasegawa et al.

[11] Patent Number: 6,128,396

[45] Date of Patent: *Oct. 3, 2000

[54] AUTOMATIC MONITORING APPARATUS

[75] Inventors: Mitsuyo Hasegawa; Takafumi Edanami, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/925,406

[22] Filed: Sep. 8, 1997

[30] Foreign Application Priority Data

Apr. 4, 1997 [JP] Japan .................................... 9-086174

[51] Int. Cl.[7] ........................................................ G06K 9/00

[52] U.S. Cl. .......................... 382/103; 382/107; 348/155; 348/161; 348/143

[58] Field of Search .................................... 382/103, 106, 382/107, 236; 348/149, 150, 151, 152, 153, 154, 155, 156, 161, 169, 143; 308/407

[56] References Cited

U.S. PATENT DOCUMENTS

| | | | |
|---|---|---|---|
| 4,737,847 | 4/1988 | Araki et al. | 348/161 |
| 4,908,704 | 3/1990 | Fujioka et al. | 348/155 |
| 5,243,418 | 9/1993 | Kuno et al. | 348/155 |
| 5,666,157 | 9/1997 | Aviv | 348/152 |

FOREIGN PATENT DOCUMENTS 4-273689 9/1992 Japan .

OTHER PUBLICATIONS

Ali et al. "Alternative practical methods for moving object detection" IEEE International Conf. on Image Processing and its Application pp. 77–80 Aug. 1992.

Dubuisson et al. "Object contour extraction using color and motion" Proc. 1993 IEEE Computer Society Conf. on Computer Vision and Pattern Recognition pp. 471–6, Jun. 1993.

*Primary Examiner*—Amelia Au
*Assistant Examiner*—Jingge Wu
*Attorney, Agent, or Firm*—Helfgott & Karas, P.C.

[57] ABSTRACT

An automatic monitoring apparatus for automatically detecting an object to be detected, such as a suspicious person, based on the picture obtained from an image pickup device. Moving object detecting unit detects information about a moving object in the picture, based on the picture signal input from the image pickup device. Characteristic quantity calculating unit calculates a characteristic quantity of the moving object based on the information detected by the moving object detecting unit. Characteristic quantity storing unit stores at least a characteristic quantity relating to a non-detection object that should not be detected. Determining unit compares the characteristic quantity of the moving object, calculated by the characteristic quantity calculating unit, with the characteristic quantity stored in the characteristic quantity storing unit, to determine whether or not the moving object is an object to be detected. Storage commanding unit causes the characteristic quantity of the moving object, calculated by the characteristic quantity calculating unit, to be selectively stored in the characteristic quantity storing unit.

10 Claims, 12 Drawing Sheets

AUTOMATIC MONITORING APPARATUS

BACKGROUND OF THE INVENTION

1. Field of the Invention

The present invention relates to an automatic monitoring apparatus, and more particularly, to an automatic monitoring apparatus for automatically detecting a detection object, such as a suspicious person, based on the picture obtained from an image pickup device.

2. Description of the Related Art

In recent years, automatic monitoring apparatus have been developed wherein an intrusion of a suspicious person is automatically detected through monitoring of a picture input from a television camera, and upon detection of the intrusion, an alarm is given or the picture is recorded.

As such conventional apparatus, an automatic monitoring apparatus disclosed in Laid-Open Japanese Patent Publication (KOKAI) No. 4-273689, for example, is known. In this automatic monitoring apparatus, the path of movement and characteristic quantities (characteristic of shape, rate of change in shape) of a moving object are extracted from the picture signal obtained from a television camera and a background picture signal. If the path of movement of the moving object deviates from a normal area into a preset precautionary area or if one of the characteristic quantities exceeds a predetermined threshold, the moving object is judged to be a suspicious person, whereupon an alarm is given or a security guard is automatically notified of the picture of the object.

FIG. 10 is a plan view of a room in which bank's cash dispensers are installed. A normal area 101 where users of the cash dispensers normally move about and a precautionary area 102 where users normally do not enter are set beforehand. If the detected path 103 of movement of a person enters the precautionary area 102, the person is judged to be a suspicious person.

With the conventional automatic monitoring apparatus, however, it is difficult to detect a suspicious person with accuracy, giving rise to the problem that erroneous detection, such as detecting an innocent person as being suspicious, or conversely, failing to detect a true intruder, occurs with high frequency.

For example, let it be assumed that, as shown in FIG. 11, a television camera (not shown) is aimed at the upper part of a prison's wall 104 and that a precautionary area 105 is set within the picture obtained from the television camera. In this case, if a moving object 106 exists in the precautionary area 105, then it is judged to be a suspicious person. However, as shown in FIG. 12, it is probable that a bird 107 flies across the precautionary area 105, and also in such a case, the conventional apparatus judges the bird 107 a suspicious person.

Also, in the case where a road runs outside of the wall 104 and in the nighttime light from the headlights of an automobile impinges upon the wall 104, a problem arises in that the background illuminated with the light is detected as a moving object, though in actuality no moving object exists in the precautionary area 105.

Erroneous detection impairs the reliance on the automatic monitoring apparatus, and therefore, the frequency of erroneous detection should desirably be reduced as low as possible.

Further, when setting the precautionary area or thresholds used for comparison, a problem arises in that the acquisition, setting, and input of such values consume much labor.

SUMMARY OF THE INVENTION

An object of the present invention is to provide an automatic monitoring apparatus capable of higher-accuracy detection of an object to be detected.

Another object of the present invention is to provide an automatic monitoring apparatus capable of saving the labor involved in the setting of the precautionary area and thresholds.

To achieve the above objects, there is provided an automatic monitoring apparatus for automatically detecting a detection object, based on a picture obtained from an image pickup device. The automatic monitoring apparatus comprises moving object detecting means for detecting information about a moving object in the picture, based on a picture signal input from the image pickup device, characteristic quantity calculating means for calculating a characteristic quantity of the moving object, based on the information detected by the moving object detecting means, characteristic quantity storing means for storing at least a characteristic quantity relating to a non-detection object that should not be detected, and determining means for comparing the characteristic quantity calculated by the characteristic quantity calculating means with the characteristic quantity stored in the characteristic quantity storing means, to determine whether or not the moving object is an object to be detected.

The above and other objects, characteristics and advantages of the present invention will become apparent from the following description when taken in conjunction with the accompanying drawings which illustrate preferred embodiments of the present invention by way of example.

DESCRIPTION OF THE PREFERRED EMBODIMENTS

An automatic monitoring apparatus according to an embodiment of the present invention will be hereinafter described with reference to the drawings.

Figure 1:
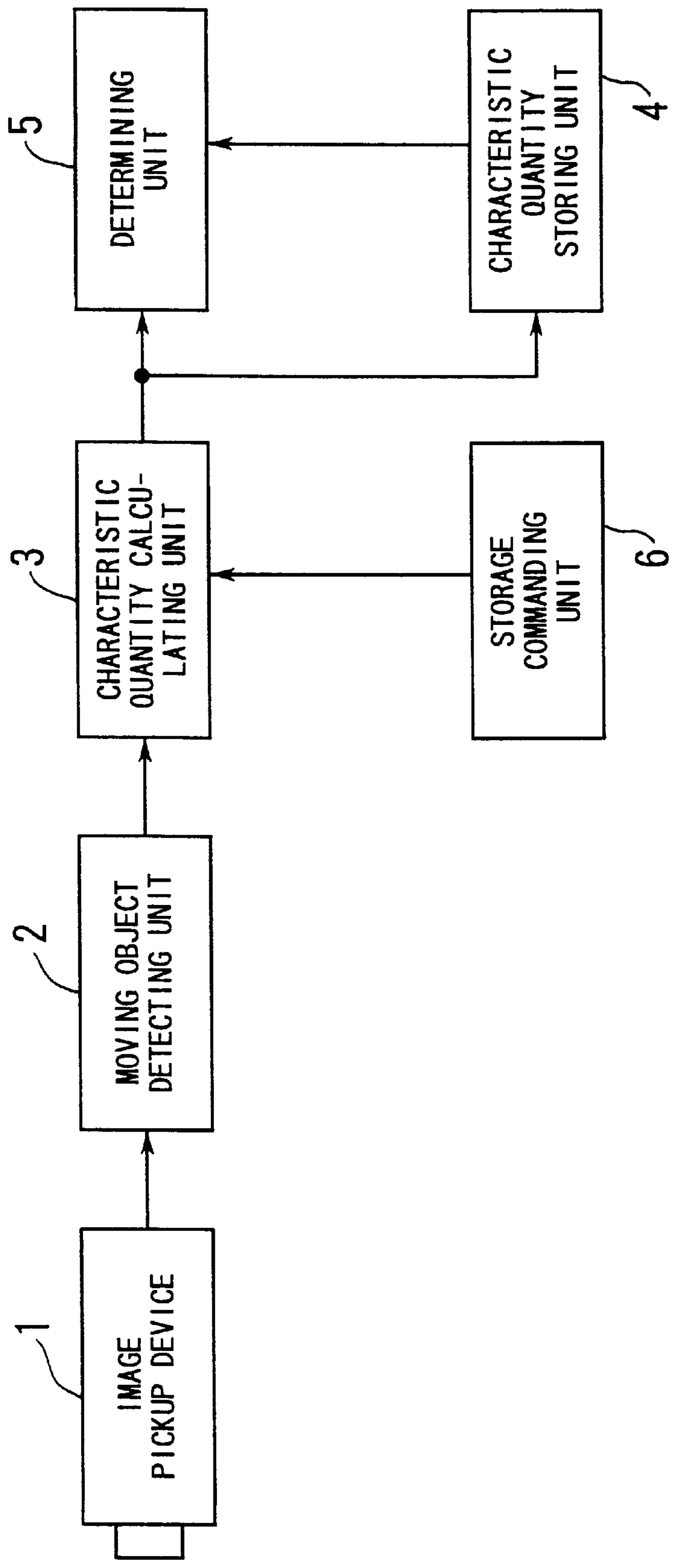
FIG. 1 is a diagram illustrating the principles of the present invention.

Referring first to FIG. 1, a theoretical configuration according to the embodiment of the present invention will be explained. The embodiment of the present invention comprises moving object detecting unit 2 for detecting information about a moving object in a picture, based on a picture signal input from an image pickup device 1, characteristic quantity calculating unit 3 for calculating a characteristic quantity of the moving object based on the information detected by the moving object detecting unit 2, characteristic quantity storing unit 4 for storing at least a characteristic quantity relating to a non-detection object that should not be detected, and determining unit 5 for comparing the characteristic quantity calculated by the characteristic quantity calculating unit 3 with the characteristic quantity stored in the characteristic quantity storing unit 4, to determine whether or not the moving object is an object to be detected.

The embodiment according to the present invention further comprises storage commanding unit 6 for causing the characteristic quantity calculated by the characteristic quantity calculating unit 3 to be stored in the characteristic quantity storing unit 4.

In the configuration described above, the image pickup device 1 such as a television camera continuously acquires a picture of a location to be monitored and sends a picture signal thereof to the moving object detecting unit 2. Based on the picture signal input from the image pickup device 1, the moving object detecting unit 2 detects information about a moving object in the picture. The characteristic quantity calculating unit 3 calculates a characteristic quantity of the moving object based on the information detected by the moving object detecting unit 2. The characteristic quantity comprises, for example, the position, size, color pattern information, amount of movement, etc. of the moving object.

On the other hand, the characteristic quantity storing unit 4 stores at least a characteristic quantity relating to a non-detection object that should not be detected. The characteristic quantity storing unit 4 preferably comprises first characteristic quantity storing unit for storing the characteristic quantity relating to a non-detection object that should not be detected, and second characteristic quantity storing unit for storing the characteristic quantity relating to an object to be detected. The determining unit 5 compares the characteristic quantity relating to the moving object, calculated by the characteristic quantity calculating unit 3, with the characteristic quantity stored in the characteristic quantity storing unit 4, to determine whether or not the moving object is an object to be detected.

Thus, an object of detection can be detected with enhanced accuracy insofar as the type of characteristic quantity is appropriately selected and the characteristic quantity stored in the characteristic quantity storing unit 4 for the purpose of comparison is set to a suitable value.

Also, in the initial stage of operation, while viewing an actual picture supplied from the image pickup device 1, the operator determines whether an object moving in the picture is a moving object to be detected or a moving object which should not be detected. In accordance with the result of determination, the storage commanding unit 6 causes the characteristic quantity relating to the moving object, calculated by the characteristic quantity calculating unit 3, to be selectively stored in the characteristic quantity storing unit 4. Namely, the characteristic quantity storing unit 4 can learn at least the characteristic quantity relating to a non-detection object that should not be detected. In the case where the characteristic quantity storing unit 4 includes the first and second characteristic quantity storing unit as mentioned above, it can learn the characteristic quantity relating to a detection object to be detected, in addition to the characteristic quantity relating to a non-detection object, in which case the determining unit 5 can make a judgment with enhanced accuracy.

By using also the characteristic quantity obtained based on an actual moving object, the characteristic quantity storing unit 4 can learn the characteristic quantity relating to a non-detection object as well as the characteristic quantity relating to a detection object. Accordingly, it is possible to automatically acquire a highly accurate characteristic quantity used for the purpose of comparison, without requiring manual operation, and to set such characteristic quantity with ease.

The embodiment of the present invention will be now described in more detail.

Figure 2:
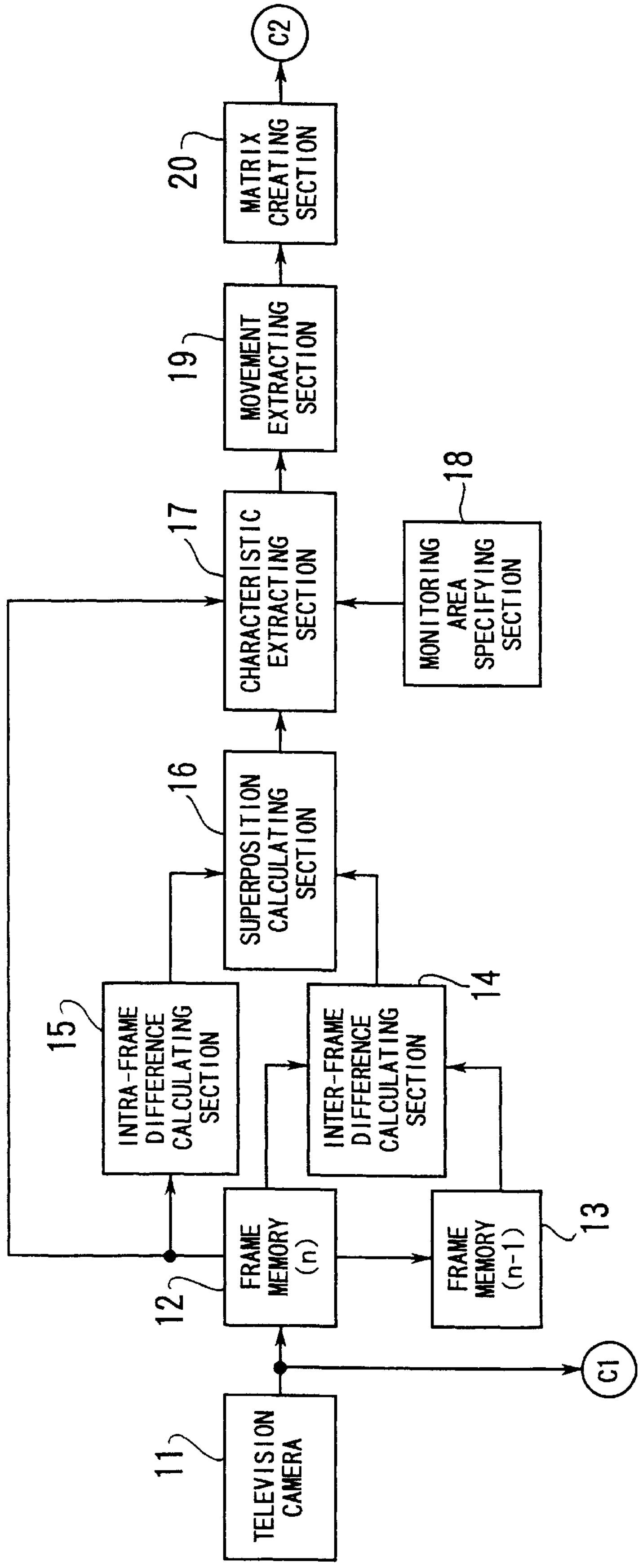
FIG. 2 is a block diagram showing half of detailed construction according to an embodiment of the present invention.
Figure 3:
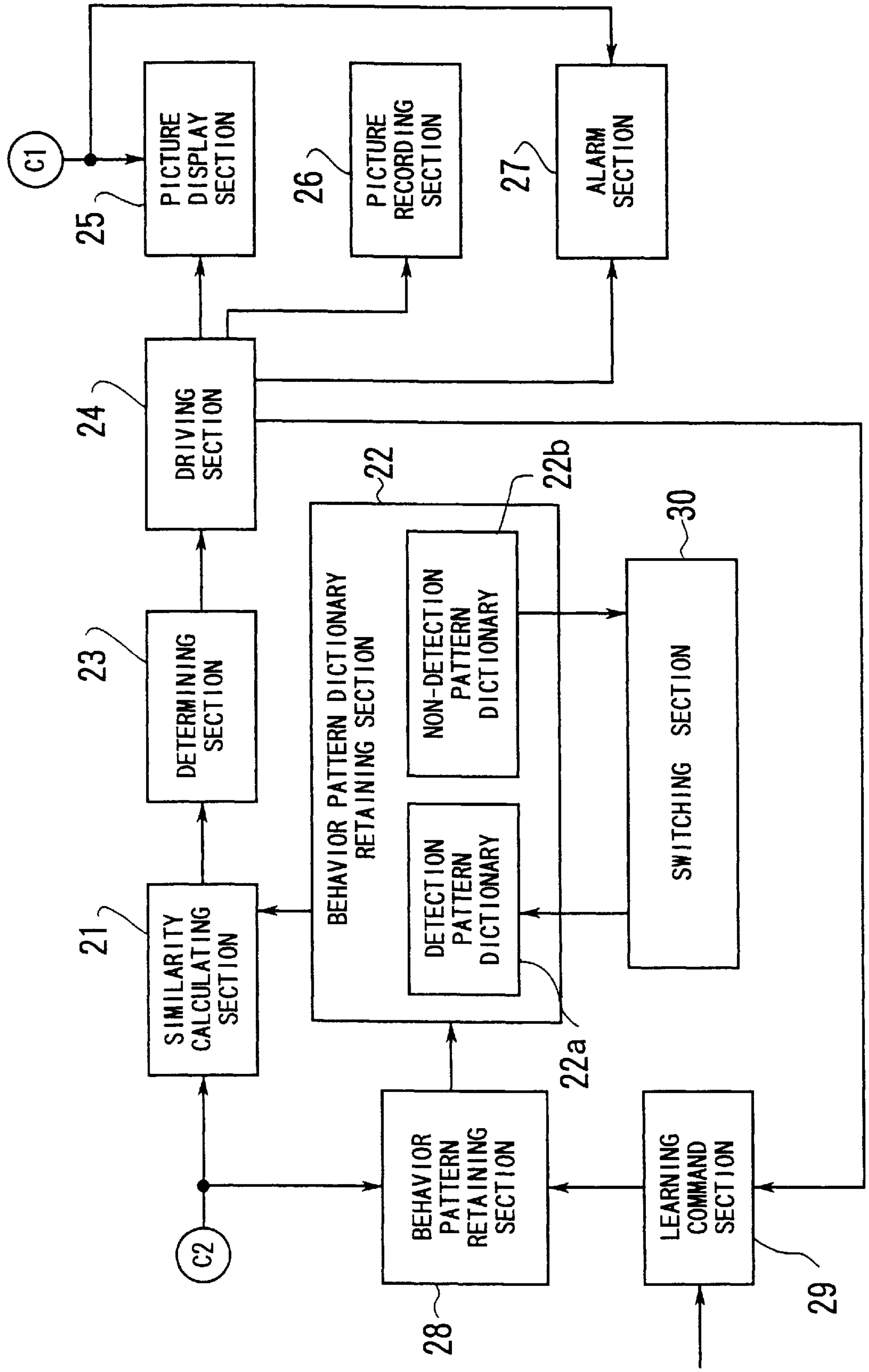
FIG. 3 is a block diagram showing the remaining half of the detailed construction according to the embodiment of the present invention.

FIGS. 2 and 3 are block diagrams showing detailed construction according to the embodiment of the present invention, wherein FIG. 2 shows half of the construction while FIG. 3 shows the remaining half.

In FIG. 2, a television camera 11 acquires a picture of a location to be monitored, and outputs a color picture in the form of frame signal. The frame signal output from the television camera 11 is input to a frame memory 12. On receiving the present frame signal from the television camera 11, the frame memory 12 transfers the immediately preceding frame signal retained therein until then to a frame memory 13 and stores the present frame signal. The frame memory 13 writes the immediately preceding frame signal over the second preceding frame signal retained therein until then.

An inter-frame difference calculating section 14 reads the frame signals stored in the frame memories 12 and 13, respectively, and calculates the difference between the two frames. This inter-frame difference represents only an image of a moving object. An intra-frame difference calculating section 15, on the other hand, reads the present frame signal stored in the frame memory 12 and calculates an intra-frame difference. The intra-frame difference represents edges (contours) in the image. A superposition calculating section 16 detects a superposed region where the inter-frame difference supplied from the inter-frame difference calculating section 14 and the intra-frame difference supplied from the intra-frame difference calculating section 15 overlap each other. The superposed region represents only the edge of a moving object in the image.

Namely, in the case of detecting a moving object, with a conventional method using the difference between an image of a moving object and its background image, there is the possibility of a moving object being detected due to illumination of a light, etc., though in actuality no moving object exists. In another method using the inter-frame difference alone, if a moving object suddenly makes a large motion, there is the possibility that the single moving object is erroneously recognized as two separate moving objects. By contrast, according to the method of the present invention in which only the edge of a moving object in the image is detected, neither of these problems arises. Meanwhile, even the above conventional detection methods, if applied to this embodiment, can provide a modest advantage.

Figure 4:
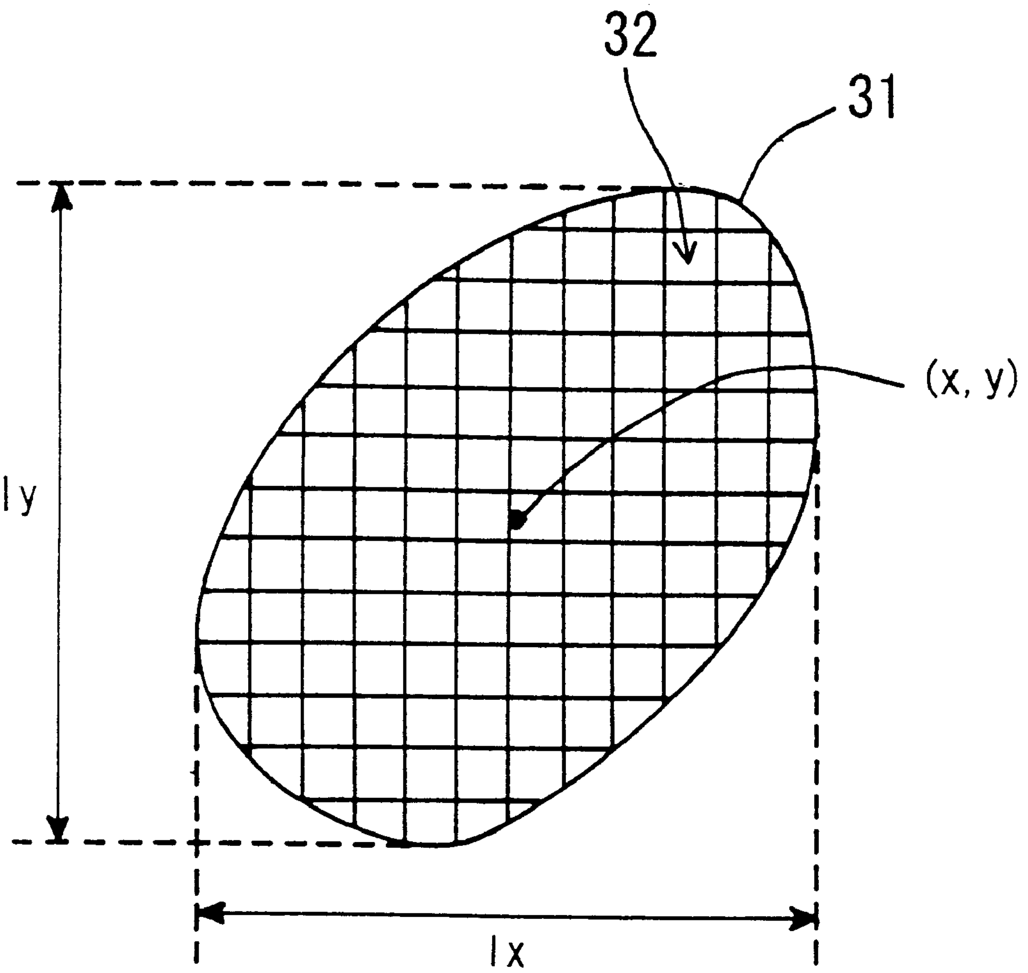
FIG. 4 is a diagram showing the shape of a moving object by way of example.

Based on the edge of the imaged moving object output from the superposition calculating section 16, a characteristic extracting section 17 extracts only a part of the edge of the moving object in the image which part falls within an area specified by a monitoring area specifying section 18, and then calculates a characteristic quantity in the extracted part. The monitoring area specifying section 18 specifies the area to be monitored, in accordance with an external command. Referring now to FIG. 4, the characteristic quantity calculated in the characteristic extracting section 17 will be explained.

FIG. 4 is a diagram showing, by way of example, an extracted shape of a moving object. Specifically, the characteristic extracting section 17 calculates coordinates (x, y) of the center of gravity of a region 32 enclosed by an edge 31 of the imaged moving object, sizes lx and ly of the region 32 in x and y directions, respectively, and color pattern information C of the region 32. The color pattern information C is expressed as a matrix consisting of average values of the colors in individual squares which are obtained by segmenting the region 32 into squares of predetermined size, and is calculated from color information supplied directly from the frame memory 12.

The characteristic quantity is supplied to a movement extracting section 19. The movement extracting section 19 calculates amounts Δx and Δy of movement of the center of gravity in the x and y directions, respectively, based on the characteristic quantity at the instant t of generation of the present frame and the characteristic quantity at the instant (t−1) of generation of the preceding frame. The characteristic quantity F(t) at the instant t is then output to a matrix creating section 20. The characteristic quantity F(t) comprises the coordinates (x, y) of the center of gravity of the region 32, the sizes lx and ly of the region 32 in the x and y directions, respectively, the color pattern information C, and the amounts Δx and Δy of movement of the center of gravity in the x and y directions, respectively, as indicated by expression (1) below.

$$F(t)=(x,\ y,\ lx,\ ly,\ C,\ \Delta x,\ \Delta y,) \quad (1)$$

The matrix creating section 20 creates a movement pattern matrix MF(t), indicated by expression (2) below, by accumulating the characteristic quantities F(t), F(t+1), F(t+2), F(t+3), . . . during a period from the time the moving object appears in the monitoring area until it disappears from the same.

$$MF(t)=[F(t),\ F(t+1),\ F(t+2),\ \ldots\ ] \quad (2)$$

Referring now to FIG. 3, a similarity calculating section 21 calculates distances Dtd and Dfd on the basis of the movement pattern matrix MF(t) output from the matrix creating section 20, as well as detection pattern data TD(n) and non-detection pattern data FD(n) stored in a behavior pattern dictionary retaining section 22.

The behavior pattern dictionary retaining section 22 comprises a detection pattern dictionary **22*a* and a non-detection pattern dictionary 22*b*: the detection pattern dictionary 22*a* holds the detection pattern data TD(n) indicated by expression (3) below while the non-detection pattern dictionary 22*b*** holds the non-detection pattern data FD(n) indicated by expression (4) below.

$$TD(n)=[Td0(t),\ Td1(t),\ Td2(t),\ \ldots\ ] \quad (3)$$

$$FD(n)=[Fd0(t),\ Fd1(t),\ Fd2(t),\ \ldots\ ] \quad (4)$$

The detection pattern data TD(n) and the non-detection pattern data FD(n) are generated by the method described later; Td0(t), Td1(t), Td2(t), . . . of the detection pattern data TD(n) correspond to a variety of suspicious persons, respectively, and represent the movement pattern matrices MF(t) of the suspicious persons, while Fd0(t), Fd1(t), Fd2(t), . . . of the non-detection pattern data FD(n) correspond to non-suspicious persons, birds, etc., respectively, and represent their movement pattern matrices MF(t).

The distances Dtd and Dfd are calculated according to equations (5) and (6) indicated below, respectively.

$$Dtd=\min(j)\left[\sum_{i=0}^{N}\{Tdj(i)-MF(i)\}\right] \quad (5)$$

$$Dfd=\min(j)\left[\sum_{i=0}^{N}\{Fdj(i)-MF(i)\}\right] \quad (6)$$

According to equation (5), the distance (corresponding to the inverse of the degree of similarity) between the characteristic quantity of the detected moving body and the characteristic quantity of each suspicious person is summed up for all instants of time, and the suspicious person showing the smallest value of the sums obtained is identified. The distance Dtd indicates the distance between the characteristic quantity of the thus-identified suspicious person and the characteristic quantity of the moving object as an object of detection. Equation (6) is identical with equation (5) in all respects, except that suspicious persons are replaced by non-suspicious persons, birds, etc. Calculation of the distance is accomplished by obtaining any one of the Euclidean distance, the city-block distance, the weighted Euclidean distance (Mahalanobis distance), etc. Also, DP (Dynamic Program) matching may be performed.

A determining section 23 receives the distances Dtd and Dfd from the similarity calculating section 21 and determines whether or not the condition indicated by expression (7) below is fulfilled.

$$Dtd<Thf \quad (7)$$

where Thf is a threshold determined as a function of the distance Dfd.

If expression (7) holds true, then it is judged that the possibility of the moving object as an object of detection being a suspicious person is extremely high. In this case, the determining section 23 notifies a driving section 24 of "intrusion of suspicious person." On receiving the notification, the driving section 24 causes a picture display section 25 to display the picture output from the television camera 11 so that the displayed picture may attract the security guard's attention. Needless to say, the picture display section 25 may be caused to display at all times the picture output from the television camera 11. Further, the driving section 24 causes a picture recording section 26 to record the picture output from the television camera 11 in case of criminal investigation etc. at a later time, and also causes an alarm section 27 to give an alarm.

The driving section 24 is also notified of "intrusion of non-suspicious person, bird, etc." from the determining section 23. Each time the driving section 24 receives such a notification, it outputs a learning command to a learning command section 29.

A behavior pattern retaining section 28 temporarily stores the movement pattern matrix MF(t) output from the matrix creating section 20. On receiving the notification "intrusion of ordinarily behaving person, bird, etc." from the driving section 24, the learning command section 29 saves the movement pattern matrix MF(t) of the moving object, which is then stored in the behavior pattern retaining section 28 and corresponds to this notification, in the non-detection pattern dictionary 22*b*. This enables the non-detection pattern dictionary 22*b* of the behavior pattern dictionary retaining section 22 to learn a variety of non-detection pattern data FD(n).

The learning command section 29 is supplied also with an external learning command entered by the operator. In the initial stage of operation, the operator causes the behavior pattern dictionary retaining section 22 to learn movement pattern matrices MF(t) of moving objects to be detected and of moving objects that should not be detected, by unit of the learning command section 29. Specifically, in the initial stage of operation, while viewing the picture displayed at the picture display section 25, the operator discriminates a detection object from a non-detection object which should not be detected each time a moving object is detected, and inputs a learning command to the learning command section 29 together with the discrimination information. In accordance with the discrimination information, the learning command section 29 causes the movement pattern matrix MF(t) stored in the behavior pattern retaining section 28 to be saved in the detection pattern dictionary 22*a* or the non-detection pattern dictionary 22*b* of the behavior pattern dictionary retaining section 22. Namely, when a moving object is judged to be a detection object, the movement pattern matrix MF(t) of this moving object is saved in the detection pattern dictionary 22*a*; on the other hand, when a moving object is judged to be a non-detection object which should not be detected, the movement pattern matrix MF(t) of this moving object is saved in the non-detection pattern dictionary 22*b*.

The learning performed in this manner permits higher-accuracy detection of suspicious persons and also saves the labor involved in the acquisition or data entry of characteristics of suspicious persons and non-suspicious persons.

Further, while viewing the picture displayed at the picture display section 25, the operator may input a command to the learning command section 29 to cause the non-detection pattern dictionary 22*b* to learn also cases where a moving object is detected because of a change of illumination in the monitoring area, light from the headlights of an automobile, etc. though in actuality no moving object exists, in the manner described above.

A switching section 30 has a timepiece therein, and transfers the movement pattern matrices MF(t) of non-detection objects, stored in the non-detection pattern dictionary 22*b*, to the detection pattern dictionary 22*a* at a predetermined time. Specifically, in the case where the monitoring area is a service entrance, for example, the movement pattern matrices MF(t) of persons passing the service entrance during a regular time zone are stored in the non-detection pattern dictionary 22*b*. Then, at the predetermined time, the movement pattern matrices MF(t) stored in the non-detection pattern dictionary 22*b* are transferred to the detection pattern dictionary 22*a*. The predetermined time is set at such a time that, from the predetermined time on, a person passing the service entrance should be recognized as a suspicious person. This serves to save the labor involved in the acquisition or data entry of characteristics of suspicious persons.

The behavior pattern dictionary retaining section 22 is constituted by a hard disk. The inter-frame difference calculating section 14, the intra-frame difference calculating section 15, the superposition calculating section 16, the characteristic extracting section 17, the movement extracting section 19, the matrix creating section 20, the similarity calculating section 21, the determining section 23, the driving section 24, the behavior pattern retaining section 28, the learning command section 29, and the switching section 30 are constituted by a processor.

Figure 11:
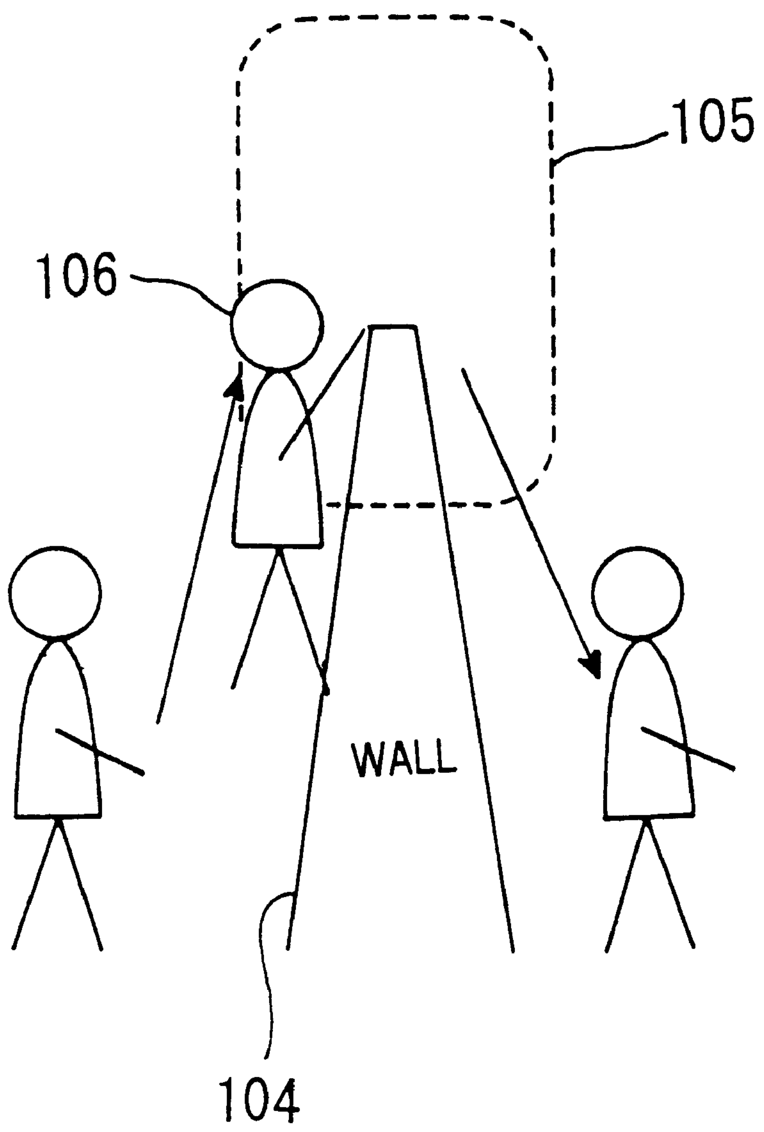
FIG. 11 is a diagram showing, by way of example, a picture obtained by a television camera and showing the behavior of a suspicious person.
Figure 12:
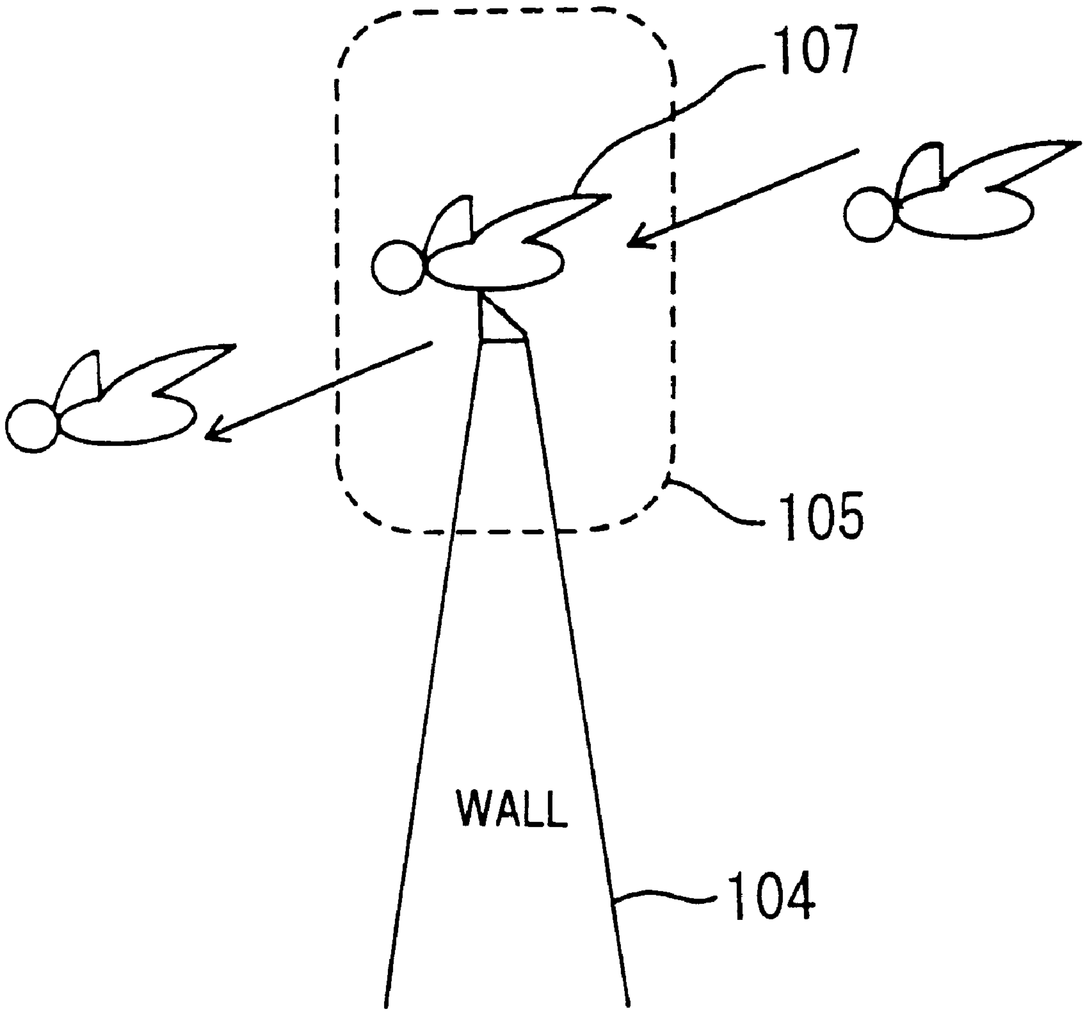
FIG. 12 is a diagram showing, by way of example, a picture obtained by the television camera and showing the movement of a bird.

This embodiment uses the movement pattern matrix MF(t) of which the characteristic quantity F(t) is based on time, as seen from expression (2). It is therefore possible to solve the problems with the conventional apparatus described with reference to FIGS. 11 and 12. This will be explained with reference to FIGS. 5 and 6.

Figure 5:
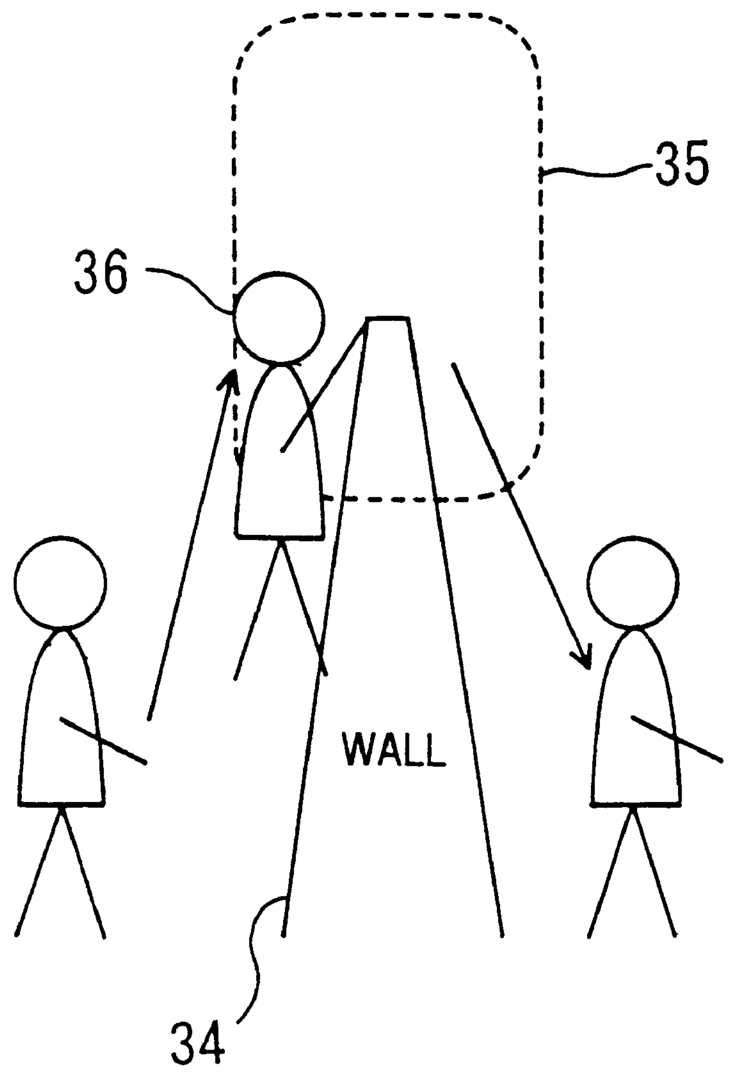
FIG. 5 is a diagram showing, by way of example, a picture obtained by a television camera and showing the behavior of a suspicious person.
Figure 6:
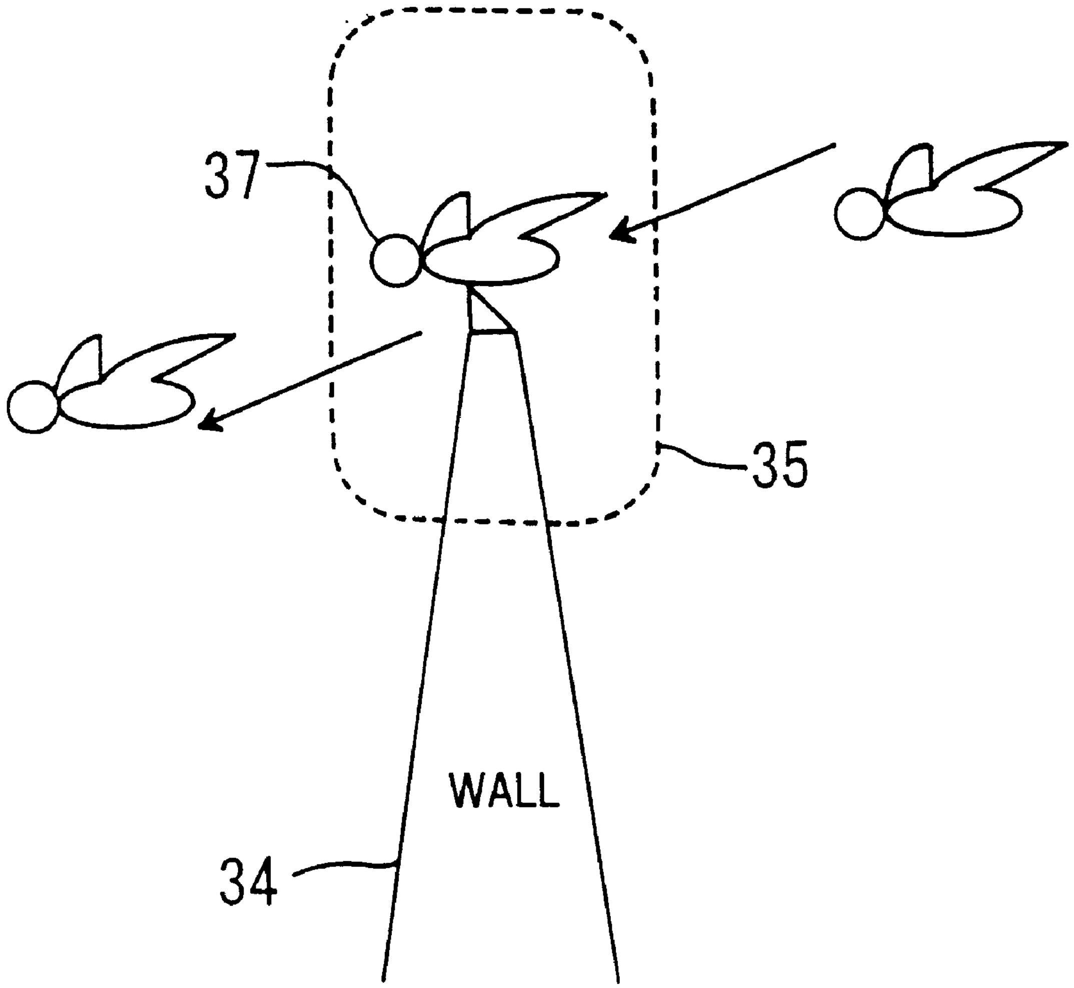
FIG. 6 is a diagram showing, by way of example, a picture obtained by the television camera and showing the movement of a bird.

FIGS. 5 and 6 are diagrams showing examples of pictures obtained from a television camera, wherein FIG. 5 shows the behavior of a suspicious person and FIG. 6 shows a bird passing the same location. Here, let it be assumed that the television camera (not shown) is aimed at the upper part of a prison's wall 34 and that a monitoring area 35 is set within the picture obtained by the television camera. In FIG. 5, a suspicious person 36 is climbing from left to right over the wall 34 and should naturally be detected as a suspicious person. In FIG. 6, on the other hand, a bird 37 is flying from right to left and should not be detected as a suspicious person.

In the cases of the suspicious person 36 and the bird 37, there must be a significant difference in respect of all or any one of the coordinates (x, y) of the center of gravity of their image, the sizes lx and ly of the image in the x and y directions and the color pattern information C, so that the two can be clearly distinguished from each other. If, however, the two objects show a high degree of similarity under special circumstances, then there is the possibility of erroneous detection being made. According to this embodiment, since the suspicious person 36 moves from left to right while the bird 37 moves from right to left, the difference in the moving direction results in a large difference in the movement pattern matrix MF(t). The movement pattern matrix MF(t) involves time-based quantities; therefore, two moving objects, however similar they are, show a large difference because of a difference in their behavior. Accordingly, it is possible to detect a suspicious person with accuracy.

In this embodiment, the sizes lx and ly in the x and y directions are set as part of the characteristic quantity F(t), as shown in expression (1). The ratio lx/ly may be calculated and used so as to enhance the accuracy in suspicious person detection, as explained below with reference to FIGS. 7 and 8.

Figure 7:
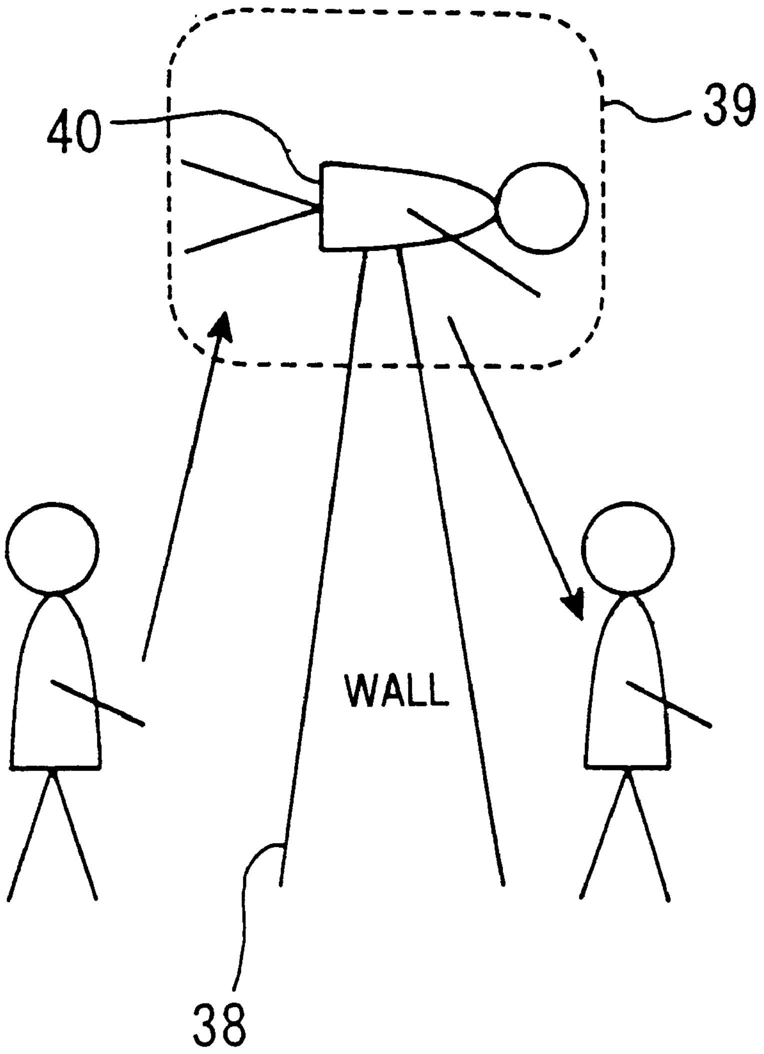
FIG. 7 is a diagram showing, by way of example, a picture obtained by the television camera and showing the behavior of a suspicious person.
Figure 8:
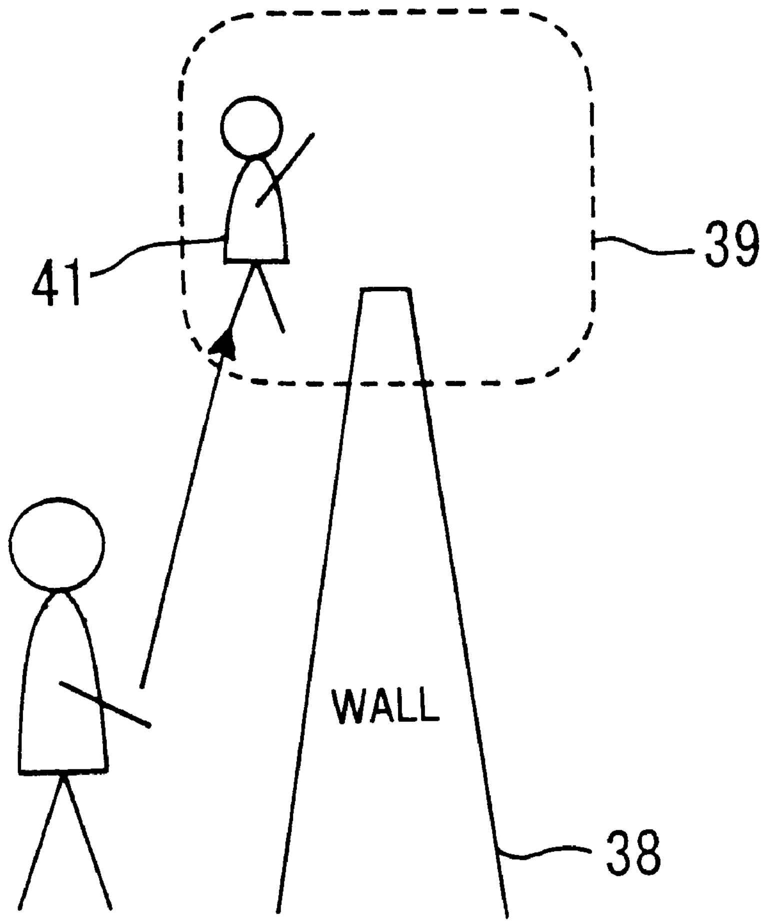
FIG. 8 is a diagram showing, by way of example, a picture obtained by the television camera and showing the normal behavior of a person passing by a wall.

FIGS. 7 and 8 are diagrams showing examples of pictures obtained by a television camera, wherein FIG. 7 shows the behavior of a suspicious person and FIG. 8 shows that of non-suspicious person passing by a wall. Let it be assumed here that the television camera (not shown) is aimed at the upper part of a prison's wall 38 and that a monitoring area 39 is set within the picture obtained by the television camera. In FIG. 7, a suspicious person 40 is climbing over the wall 38 to escape from prison and should naturally be detected as a suspicious person. On the other hand, in FIG. 8, a road runs outside of the wall 38 in parallel thereto and a non-suspicious person 41 is walking on the road. Although this person 41 enters the monitoring area 39, he/she should not be detected as a suspicious person. In these cases, the suspicious person 40 and the non-suspicious person 41 apparently differ from each other in respect of the ratio lx/ly within the monitoring area 39. Namely, one is standing while the other is lying. Therefore, by comparing the ratios lx/ly with each other, it is possible to accurately discriminate the suspicious person 40 from the non-suspicious person 41.

In this embodiment, the monitoring area specifying section 18 specifies the area to be monitored in accordance with an external command, but the area to be monitored may be automatically set so as to eliminate the need for manual labor, as explained below with reference to FIG. 9.

Figure 9:
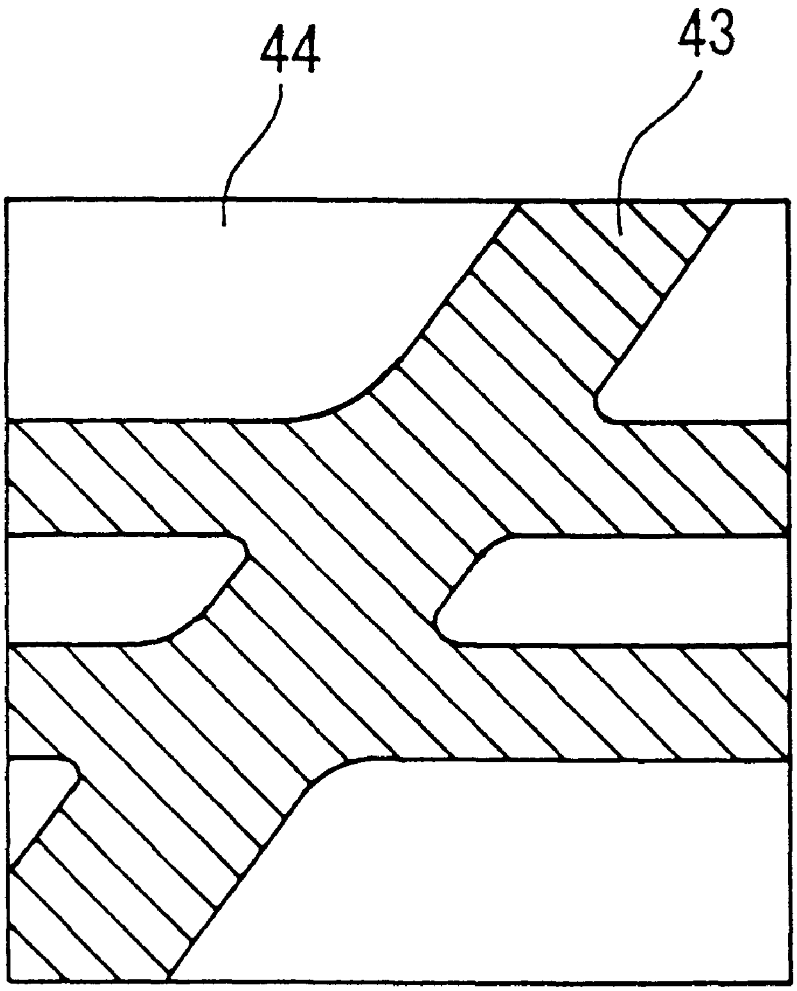
FIG. 9 is a diagram showing an example of a picture obtained by the television camera.
Figure 10:
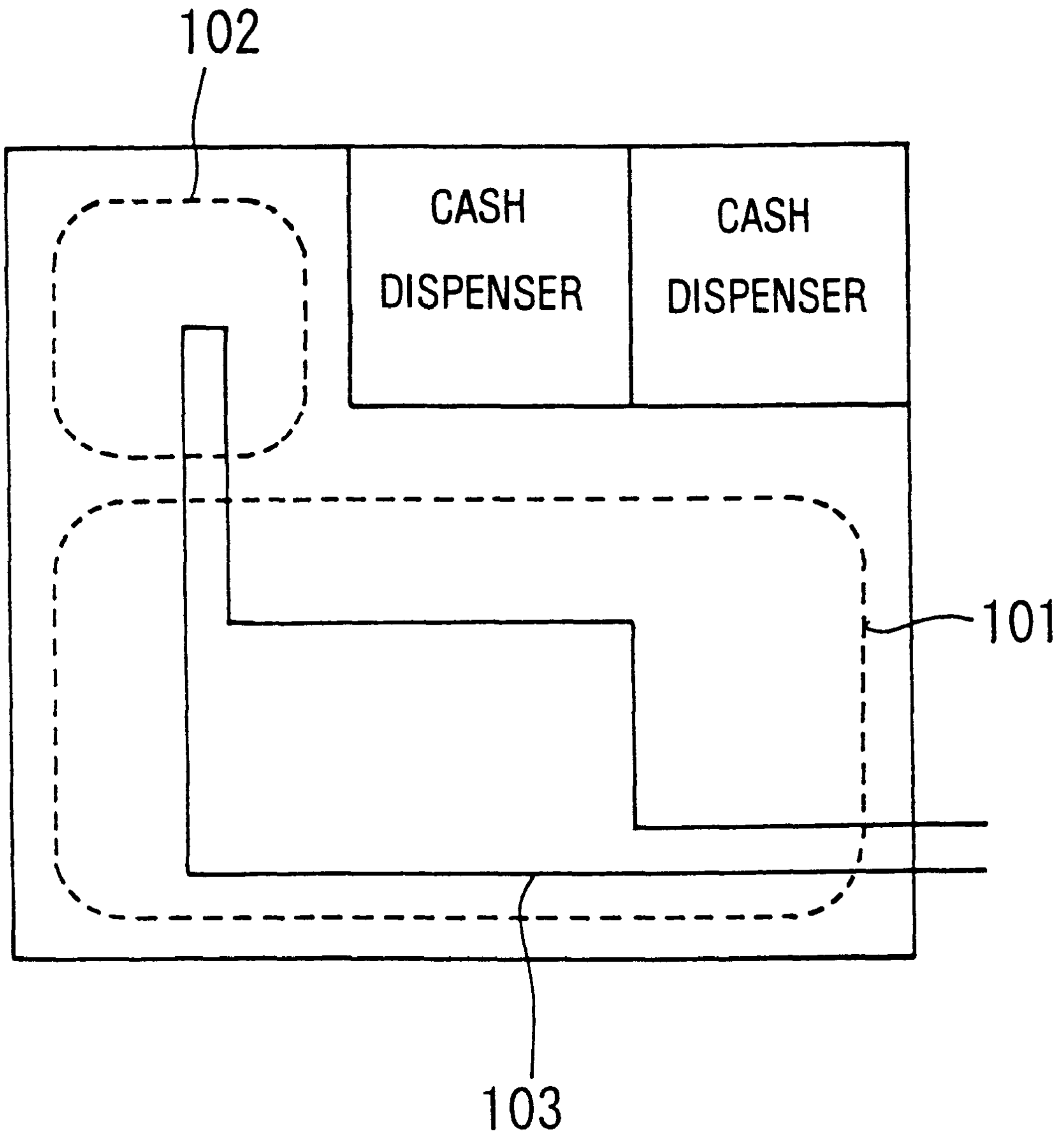
FIG. 10 is a plan view of a room in which bank's cash dispensers are installed.

FIG. 9 is a diagram showing an example of a picture obtained by a television camera. In FIG. 9, let it be assumed that a hatched part 43 indicates an area where people usually frequently pass, and that parts 44 other than the part 43 indicate areas where people are not allowed to enter.

In this case, the coordinates (x, y) of the centers of gravity of moving objects appearing in the picture are accumulated for a long period of time to obtain a histogram thereof. The area 43 can then be identified by the histogram. Thus, by supplying the monitoring area specifying section 18 with the area obtained in this manner, it is possible to easily set the area to be monitored, almost without the need for manual labor. Also, even in the case where the area is complicated in shape, the area to be monitored can be set with ease.

In the foregoing embodiment, the behavior pattern dictionary retaining section 22 is provided with the detection pattern dictionary 22*a* and the non-detection pattern dictionary 22*b*. The behavior pattern dictionary retaining section 22 may alternatively be provided with the non-detection pattern dictionary 22*b* alone. In this case, although the accuracy in suspicious person detection lowers, the behavior pattern dictionary retaining section 22 can be simplified.

As described above, according to the present invention, the characteristic quantity storing unit stores at least a characteristic quantity relating to a non-detection object. The determining unit compares the characteristic quantity of a moving object, calculated by the characteristic quantity calculating unit, with the characteristic quantity stored in the characteristic quantity storing unit, to determine whether or not the moving object is a detection object to be detected. The type of characteristic quantity is appropriately selected, and also the characteristic quantity stored in the characteristic quantity storing unit is set to a suitable value.

Consequently, it is possible to detect a detection object with higher accuracy.

Also, in the initial stage of operation, while viewing the actual picture supplied from the image pickup device, the operator determines whether a moving object in the picture is a detection object or a non-detection object which should not be detected. In accordance with the result of determination, the storage commanding unit causes the characteristic quantity of the moving object, calculated by the characteristic quantity calculating unit, to be selectively stored in the characteristic quantity storing unit.

Accordingly, the characteristic quantity storing unit can learn at least the characteristic quantities of non-detection objects which should not be detected, so that the determining unit can make a judgment with enhanced accuracy.

Further, by using the characteristic quantities obtained based on actual moving objects, the characteristic quantity storing unit can learn the characteristic quantities of detection objects, in addition to the characteristic quantities of non-detection objects. It is therefore possible to automatically acquire high-accuracy characteristic quantities used for the purpose of comparison, without requiring manual labor, and also to facilitate the setting of such characteristic quantities.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An automatic monitoring apparatus for automatically detecting a detection object to be detected, based on a picture obtained from an image pickup device, comprising:

moving object detecting means for detecting information about a moving object in the picture, based on a picture signal input from the image pickup device;

characteristic quantity calculating means for calculating a characteristic quantity of the moving object, based on the information detected by the said moving object detecting means;

characteristic quantity storing means for storing at least a characteristic quantity relating to a non-detection object that should not be detected; and determining means for comparing the characteristic quantity calculated by said characteristic quantity calculating means with the characteristic quantity stored in said characteristic quantity storing means, to determine whether or not the moving object is an object to be detected;

wherein said characteristic quantity storing means includes:

first characteristic quantity storing means for storing the characteristic quantity relating to a non-detection object that should not be detected; and second characteristic quantity storing means for storing the characteristic quantity relating to a detection object to be detected, wherein said moving object detecting means includes:

inter-frame difference calculating means for calculating an inter-frame difference based on a frame picture signal input from the image pickup device, intra-frame difference calculating means for calculating an intra-frame difference based on the frame picture signal, and superposition detecting means for detecting a superposed region where the inter-frame difference supplied from said inter-frame difference calculating means and the intra-frame difference supplied from said intra-frame difference calculating means overlap each other.

2. The automatic monitoring apparatus according to claim 1, further comprising storage commanding means for causing the characteristic quantity calculated by said characteristic quantity calculating means to be stored in said characteristic quantity storing means.

3. The automatic monitoring apparatus according to claim 1, further comprising characteristic quantity transfer means for transferring the characteristic quantity stored in said first characteristic quantity storing means to said second characteristic quantity storing means at a predetermined time.

4. The automatic monitoring apparatus according to claim 1, wherein said determining means includes first distance calculating means for calculating a first distance between the characteristic quantity calculated by said characteristic quantity calculating means and the characteristic quantity stored in said first characteristic quantity storing means, second distance calculating means for calculating a second distance between the characteristic quantity calculated by said characteristic quantity calculating means and the characteristic quantity stored in said second characteristic quantity storing means, and detection object determining means for comparing the second distance with a predetermined threshold, and determining that the moving object is an object to be detected if the second distance is smaller than the predetermined threshold.

5. The automatic monitoring apparatus according to claim 4, wherein the predetermined threshold is determined in accordance with the first distance.

6. The automatic monitoring apparatus according to claim 1, wherein said characteristic quantity calculating means calculates a position and size of the moving object.

7. The automatic monitoring apparatus according to claim 1, wherein said characteristic quantity calculating means calculates a horizontal size-to-vertical size ratio of the moving object.

8. The automatic monitoring apparatus according to claim 1, wherein said characteristic quantity calculating means calculates color pattern information about the moving object.

9. The automatic monitoring apparatus according to claim 1, wherein said characteristic quantity calculating means calculates an amount of movement of the moving object.

10. The automatic monitoring apparatus according to claim 1, further comprising accumulating means for accumulating the characteristic quantity calculated by said characteristic quantity calculating means for a predetermined period of time, and area setting means for setting a picture area with respect to which information about a moving object is to be detected by said moving object detecting means, by using the characteristic quantities accumulated by said accumulating means.

* * * * *